Jan. 16, 1973   J. L. BLUMENTHAL ET AL   3,711,327
PLASMA ARC SPRAYED MODIFIED ALUMINA HIGH
EMITTANCE COATINGS FOR NOBLE METALS
Filed Jan. 4, 1968

David F. Carroll
Jack L. Blumenthal
John R. Ogren
INVENTORS

BY

ATTORNEY 3,711,327
PLASMA ARC SPRAYED MODIFIED ALUMINA HIGH EMITTANCE COATINGS FOR NOBLE METALS
Jack L. Blumenthal, Los Angeles, David F. Carroll, Torrance, and John R. Ogren, La Palma, Calif., granted to the United States Atomic Energy Commission under the Provisions of 42 U.S.C. 2182
Filed Jan. 4, 1968, Ser. No. 695,796
Int. Cl. C23c 3/04, 7/00
U.S. Cl. 117—227          7 Claims

ABSTRACT OF THE DISCLOSURE

A method of applying a controlled emittance to a noble metal selected from the group including ruthenium, rhodium, palladium, osmium, iridium and platinum, and intra-alloys thereof. The coating is applied by plasma arc spraying modified alumina on a surface of one of the noble metals group, the alumina being modified by having alumina powder contain a dispersion of a noble metal black selected from the above group.

A cladding of one of the group of noble metals above, having a layer of plasma arc sprayed modified alumina bonded on at least one surface thereof, the alumina being modified as indicated in the above method.

BACKGROUND OF THE INVENTION

Controlling the surface emittance of radioisotope containment vessels for aerospace applications has been a problem in the prior art. This problem has been particularly severe in view of safety requirements which are that no release of the radioactive contents be allowed under any conceivable situation, that is, both normal operation and all abnormal modes of operation, including abort modes. The most probable situation involves exposure of a fuel vessel to terrestial gases, such as air or water vapor and carbon dioxide, at elevated temperatures of up to 2500° F. for an extended period of time measured in years. The survivability of the vessel in this situation depends strongly upon the surface temperature of the vessel which can be lowered to an acceptable level by the use of a high emittance coating according to the invention.

Containment material for radioisotope vessels should include a refractory metal strength member clad with a noble metal. The refractory metals usually include vanadium, niobium (columbium), tantalum, chromium, molybdenum, tungsten and rhenium. The refractory metal provides high temperature (1600° F.) creep strength, and the noble metal provides protection from the rapid, high temperature oxidation that a bare refractory metal container would incur. The noble metal cladding has a disadvantage and that is its low emissivity, about 0.2. Hemispherical total emissivity, $E_{ht}$, is the ratio of the radiancy (rate of emission of radiant energy from a unit area of surface) of a polished surface to that of a black body at the same temperature.

The steady state temperature of a radioisotope capsule in a ground abort situation, for example, is determined principally by the emissivity of its surface; the higher the emissivity, the lower the capsule temperature. When noble metal claddings are used for oxidation protection of refractory metals, they degrade at a rate dependent strongly upon temperature. Thus, any reduction in capsule temperature achieved by increasing the emissivity of a noble metal cladding will enhance the capsule ground abort survivability.

SUMMARY OF THE INVENTION

The invention generally relates to a means to increase the total emittance of noble metals. It has been surprisingly found that when alumina, $Al_2O_3$, is modified with a noble metal "black" and plasma arc sprayed on a noble metal, as described above, the total emittance increase over that of the bare noble metal is approximately 250%. The invention is comprised of a method to modify alumina with a dispersion of a noble metal black and then to plasma arc spray the modified alumina on the noble metal to provide a high emittance coating.

An object of this invention is to provide a method for applying a high emittance coating of alumina modified with a noble metal black.

Another object of the invention is to provide a method for modifying alumina with a noble metal black.

Still another object of the invention is to provide a high emittance cladding formed of a noble metal having a modified alumina coating.

A further object of the invention is to provide a noble metal coating which retains its ductility after high temperature service in both vacua and air.

A still further object of the invention is to provide a modified alumina, high emittance coating for noble metal substrates in which no chemical interactions occur, and the inherent oxidation resistance of the noble metal substrate remains unaffected by the coating.

Further objects and advantages of the invention may be brought out in the following part of the specification wherein small details have been described for the competence of disclosure, without intending to limit the scope of the invention which is set forth in the appended claims.

BRIEF DESCRIPTION OF THE DRAWINGS

Referring to the accompanying drawings, which are for illustrative purposes.

DESCRIPTION OF THE PREFERRED EMBODIMENT

The inventive process is comprised of modifying alumina with a noble metal black selected from the noble metal group including ruthenium, rhodium, palladium, osmium, iridium and platinum and intra-alloys thereof. The alumina may be modified with a noble metal black in all concentrations such that a substantial quantity of the noble metal remains as a finely dispersed noble metal black after plasma arc spraying the modified alumina on the noble metal substrate. In other words, as long as the noble metal remains in a fine dispersion as a black, it is not in excess in the mixture with the alumina.

For the purpose of the process, the source of the noble metal may be in a soluble form so that it may be put into solution with the alumina. Such noble metal compounds are: chloroplatinic acid, $IrCl_4$, $[Rh(NH_3)_6]Cl_3$, $RuCl_4 \cdot 5H_2O$, and $OsCl_3$ An example of the process to synthesize a five weight percent platinum modified (platinized) alumina is as follows:

(1) Dissolve 22.58 g. of chloroplatinic acid, $H_2PtCl_6 \cdot 6H_2O$ in 250 ml. of water.

(2) Add 147.5 g. of alumina, $Al_2O_3$, to the above solution (−200 mesh, +325 mesh; that is, in the range of 44 to 75 microns particle size).

(3) Blend the mixture in the solution for 12 hours to 18 hours at room temperature.

(4) Heat from 90° to 95° C. and continue blending for 3 to 4 hours.

(5) Dry in a vacuum oven for 48 to 65 hours at 60 to 65° C.

(6) Pulverize the resulting dried cake of platinized alumina and heat for 3 to 4 hours in flow hydrogen at from 500° to 700° C. to remove the hydrogen chloride.

That last step may also be accomplished in still air at 500° C.

Figure 1:
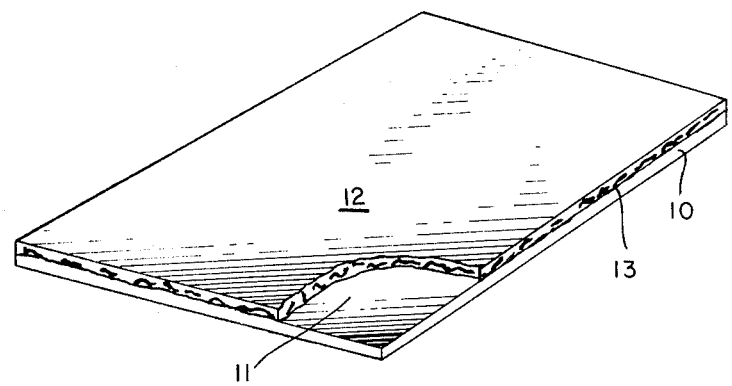
FIG. 1 is an isometric view of a noble metal substrate having a plasma arc sprayed modified alumina high emittance coating thereon.

The noble metal or intra-noble metal alloy substrate is then plasma arc sprayed with the platinized alumina to establish a high emittance coating having a thickness of from 0.003 inch to 0.009 inch. The thickness of the noble metal or alloy used for cladding on radioisotope containment vessels is in the range of from 0.020 inch to 0.100 inch. There is shown in FIG. 1 a substrate in the form of a flat plate 10 of one of the noble metals stated, having diffusion bonded on one side 11, a modified alumina high emittance coating 12, plasma arc sprayed thereon. The diffusion bonding is shown in the irregular surfaces as at 13 where the modified alumina is joined to the noble metal or intra-alloy thereof. This can be generally seen only through high magnification.

Figure 2:
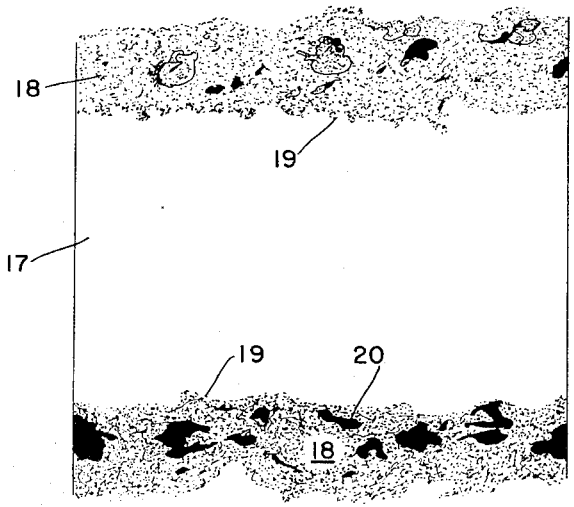
FIG. 2 is a magnified end view of a substrate of a platinum-rhodium alloy having a plasma arc sprayed platinized alumina coating bonded on two opposite surfaces thereof.

In FIG. 2 there is shown a substrate 17 of a platinum-10 weight percent rhodium alloy, having diffusion bonded to opposite sides, a thin layer of plasma arc sprayed platinized alumina 18. The excellent diffusion bonding at 19 between the coating and the noble metal substrate is indicated by the irregular edge penetration of the coating into the noble metal. The drawing in FIG. 2 was made in exact size from a copy of a 200X photomicrograph. The coating 18 has a dark gray color interspersed with totally black shadows formed in recesses 20 in the coatings.

Tests show that the total emittance increase over that of the bare platinum-10 percent by weight rhodium is approximately 350%; that is, the increase is from 0.2 to 0.7. The coatings 18 shown remained inert in contact with graphite in vacuum for 10 days at 1800° F. and 10 minutes at 2600° F. Emittance stability in vacuum and air was found to be exceptionally high as shown by the date in Table I below. In addition, metallographic and microhardness analysis showed no chemical interactions between the coating and substrate. The coated noble metal system remained ductile and mechanically stable after all of the heat treatments listed in Table I.

Figure 3:
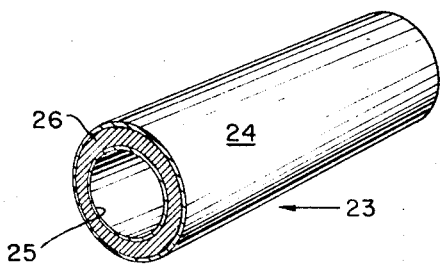
FIG. 3 is an illustration of a noble metal cladding for a refractory metal and having a plasma arc sprayed modified alumina on inner and outer cylindrical surfaces of the cladding in accordance with the invention, the end view thicknesses of the cladding and coatings being substantially exaggerated.

In FIG. 3, there is shown a tube 23, having external and internal modified alumina coatings 24 and 25, respectively, formed upon a noble metal 26, such as that shown in FIGS. 1 and 2. The thicknesses of the coatings and the noble metals are exaggerated but are shown to illustrate a tubular cladding for use on a refractory metal for containing radioisotopes.

The invention and its attendant advantages will be understood from the foregoing description, and it will be apparent that various changes may be made in the form, construction and arrangement of the parts of the invention without departing from the spirit and scope thereof or sacrificing its material advantages, the arrangment hereinbefore described as being merely by way of example. We do not wish to be restricted to the specific forms shown or uses mentioned, except as defined by the accompanying claims, wherein various portions have been separated for clarity of reading and not for emphasis.

We claim:

1. A high emittance oxidation resistant cladding comprising:
    (a) a substrate of one of the noble metals selected from the group consisting of ruthenium, rhodium, palladium, osmium, iridium and platinum and intra-alloys thereof; and
    (b) a layer of plasma arc sprayed modified alumina bonded on at least one surface of said substrate,
    (c) said alumina having been modified by a dispersion of a noble metal black selected from said group,
    (d) said noble metal black being present in any concentration such that a substantial quantity of it remains as a finely dispersed noble metal black after plasma arc spraying the modified alumina on the noble metal substrate.

2. The invention according to claim 1 in which:
said layer has a thickness in the range of from 0.003 inch to 0.009 inch.

3. The invention according to claim 1 in which:
said cladding has a hemispherical emittance range of approximately 0.58 to 0.75 in the temperature range of from 1600° F. to 2400° F.

4. The invention according to claim 1 in which:
the noble metal black concentration is in the range of from 5 to 9.5 weight percent.

5. The invention according to claim 4 in which:
the noble metal black is platinum.

6. A method of making a high emittance oxidation resistant cladding comprising:
    (a) dissolving a soluble compound of one or more of the noble metals selected from the group consisting

TABLE I

| Material | Total hemispherical emittance | | | | |
|---|---|---|---|---|---|
| | 1,600° F. | 1,800° F. | 2,000° F. | 2,200° F. | 2,400° F. |
| Platinum—10 weight percent rhodium (wrought condition) | 0.16 | 0.16 | 0.17 | 0.17 | 0.18 |
| Plasma arc sprayed platinized alumina (5 weight percent platinum in alumina) on platinum—10 weight percent rhodium alloy (wrought condition) | 0.70 | 0.70 | 0.75 | 0.67 | 0.66 |
| Plasma arc sprayed platinized alumina (5 weight percent platinum in alumina) on platinum—10 weight percent rhodium (after 10 days in vacuum in contact with graphite at 1,800° F. and 10 minutes at 2,600° F.) | 0.72 | 0.73 | 0.72 | 0.71 | 0.70 |
| Plasma arc sprayed platinized alumina (5 weight percent platinum in alumina) on platinum—10 weight percent rhodium (after 1,000 hours at 2,000° F. in flowing air) | 0.60 | 0.62 | 0.60 | 0.60 | 0.58 |
| Plasma arc sprayed platinized alumina (5 weight percent platinum in alumina) on platinum—10 weight percent rhodium (after 1,500 hours at 2,000° F. in flowing air) | 0.59 | 0.59 | 0.58 | 0.59 | 0.59 |
| Plasma arc sprayed platinized alumina (5 weight percent platinum in alumina) on platinum—10 weight percent rhodium (after 1,980 hours at 2,000° F. in flowing air) | 0.59 | 0.58 | 0.59 | 0.58 | 0.58 |
| Plasma arc sprayed platinized alumina (9.5 weight percent platinum in alumina) on platinum—10 weight percent rhodium (wrought condition) | 0.74 | 0.74 | 0.72 | 0.70 | 0.69 |

Table I also shows the effect of increasing the noble metal black. An increase of from 5 weight percent to 9.5 weight percent platinum in the modified alumina increased the mean total emittance in the 1600° to 2400° F. range by 4.3 percent, from 0.69 to 0.72. In the third example in the table, the coating is shown to have been in contact with graphite, which is typically used within a radioisotope container.

of ruthenium, rhodium, palladium, osmium, iridium, and platinum and intra-alloys thereof;

(b) adding alumina particles having a size range of from 44 to 74 microns;

(c) blending the mixture in solution at room temperature, (d) heating the solution to approximately 90° C. to 95° C., (e) drying in vacuum at temperatures from approximately 60° C. to approximately 65° C.,
(f) pulverizing the formed dried cake of mixed metal and alumina,
(g) heating the dried mixture in a gas selected from the group consisting of air and hydrogen for a period of approximately 3 to 4 hours at temperatures from approximately 500° C. to 700° C., and
(h) apply said dried mixture to a substrate of noble metal.

7. The method according to claim 6 in which:
the soluble form of the noble metal is selected from the group consisting of chloroplatinic acid, $IrCl_4$, $$[Rh(NH_3)_6]Cl_3$$

$RuCl_4 \cdot 5H_2O$, and $OsCl_3$, and mixtures thereof.

References Cited
UNITED STATES PATENTS

| | | | |
|---|---|---|---|
| 2,946,829 | 7/1960 | Likins et al. | 252—466 X(PT) |
| 2,948,672 | 8/1960 | Brennan | 252—466 X(PT) |
| 2,965,564 | 12/1960 | Kirshenbaum et al. | 252—466 X(PT) |
| 3,183,337 | 5/1965 | Winzeler et al. | 117—93.1 X |

ALFRED L. LEAVITT, Primary Examiner

J. H. NEWSOME, Assistant Examiner

U.S. Cl. X.R.

117—27, 93.1 PF, 217; 165—133; 161—225; 29—199